United States Patent [19]

Young

[11] Patent Number: 5,619,706

[45] Date of Patent: Apr. 8, 1997

[54] METHOD AND APPARATUS FOR SWITCHING BETWEEN INTERRUPT DELIVERY MECHANISMS WITHIN A MULTI-PROCESSOR SYSTEM

[75] Inventor: Bruce Young, Tigard, Oreg.

[73] Assignee: Intel Corporation, Santa Clara, Calif.

[21] Appl. No.: 399,161

[22] Filed: Mar. 2, 1995

[51] Int. Cl.[6] ............................. G06F 9/46; G06F 13/14
[52] U.S. Cl. .................. 395/741; 395/733; 395/734; 395/735; 395/739; 395/868; 395/869; 395/858; 395/291; 395/800; 395/736
[58] Field of Search ............................. 395/725, 733, 395/739, 735, 737, 775, 865, 308, 869, 800, 868, 700

[56] References Cited

U.S. PATENT DOCUMENTS

| | | | |
|---|---|---|---|
| 4,275,458 | 6/1981 | Khera | 395/735 |
| 4,930,070 | 5/1990 | Yonekura et al. | 395/735 |
| 4,980,820 | 12/1990 | Youngblood | 395/868 |
| 5,134,706 | 7/1992 | Cushing et al. | 395/725 |
| 5,283,904 | 2/1994 | Carson et al. | 395/739 |
| 5,291,605 | 3/1994 | Takagi et al. | 395/868 |
| 5,317,748 | 5/1994 | Shimuzu | 395/725 |
| 5,481,725 | 1/1996 | Jayakumar et al. | 395/725 |

*Primary Examiner*—Jack B. Harvey
*Assistant Examiner*—Raymond N. Phan
*Attorney, Agent, or Firm*—Blakely, Sokoloff, Taylor & Zafman

[57] ABSTRACT

A switching circuit and method for transparently switching between two interrupt delivery mechanisms; namely a first interrupt circuit and a second interrupt circuit. The first interrupt circuit is adapted to service an interrupt request upon detecting that one of a plurality of interrupt request lines, referred to as "IRQ1 line" is asserted. Likewise, the second interrupt circuit is adapted to detect a second interrupt request through assertion of a second interrupt request "IRQ2" line. The switching circuit comprises a combinatorial logic unit, coupled to the IRQ1 and IRQ2 lines, for selectively (i) asserting the IRQ1 line upon detecting the second interrupt request, provided the second interrupt request requires interrupt service by the first interrupt circuit and (ii) deasserting the IRQ1 line upon detecting the second interrupt request if the second interrupt request propagating through the IRQ2 line does not require interrupt service by the first interrupt circuit.

29 Claims, 5 Drawing Sheets

METHOD AND APPARATUS FOR SWITCHING BETWEEN INTERRUPT DELIVERY MECHANISMS WITHIN A MULTI-PROCESSOR SYSTEM

BACKGROUND OF THE INVENTION

1. Field of the Invention

The present invention relates to the field of electronic circuits. More particularly, this invention relates to a circuit and method for transparently switching between two independent interrupt delivery mechanisms preferably implemented within a multi-processor system.

2. Description of the Prior Art

Fundamental to the performance of any computer system, a processor performs a number of operations including controlling various intermittent "services" requested by peripheral devices coupled to the computer system. These services may include data transmission, data capture or any other data manipulative operations essential to the functionality of the peripheral devices. Two interrupt delivery mechanisms are currently being used for detecting an interrupt request from one of the peripheral devices and for advising the processor that a particular service corresponding to the interrupt request needs to be performed; namely, (i) a Programmable Interrupt Controller ("PIC") interrupt delivery mechanism and (ii) an Advanced Programmable Interrupt Controller ("APIC") interrupt delivery mechanism.

Figure 1:
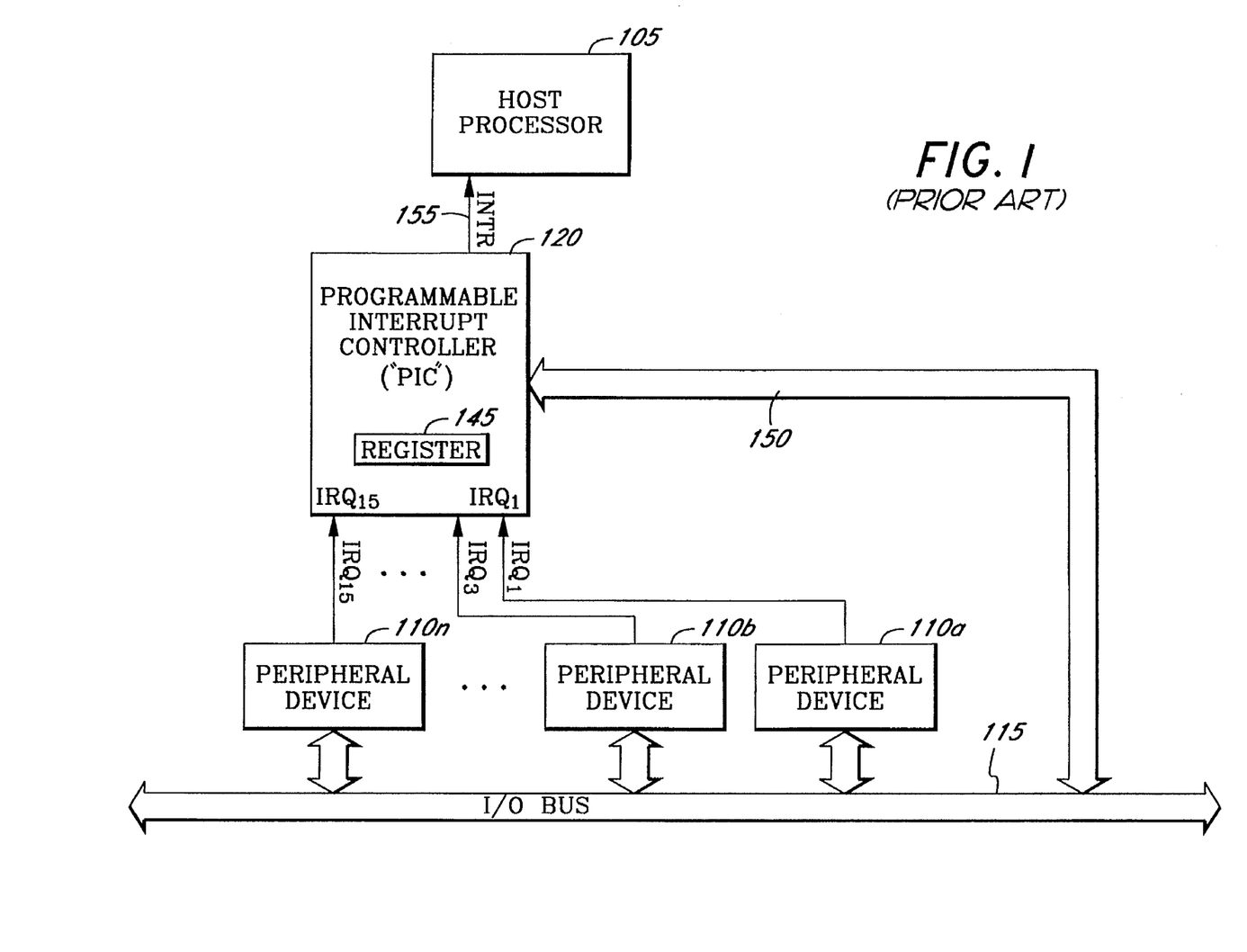
FIG. 1 is a block diagram of a conventional uni-processor system comprising a conventional programmable interrupt controller ("PIC") delivering interrupts directly to the processor.

For the last two decades, PICs have been widely used as an interrupt delivery mechanism, usually for uni-processor systems. As shown in FIG. 1, a single host processor 105 operates in conjunction with an arbitrary number "n" of peripheral devices 110a–110n which are either permanently coupled to an I/O bus 115 (e.g., an ISA, EISA or PCI bus) or removably coupled to the I/O bus 115 through printed circuit cards, etc. These peripheral devices 110a–110n are coupled to a PIC 120 through a limited number of interrupt request ("IRQ") lines. As shown, the PIC 120 may have an Intel® 82C59 architecture which is capable of supporting fourteen (14) interrupt requests from peripheral devices 110a–110n via $IRQ_1$ and $IRQ_3$–$IRQ_{15}$ lines 126 and 128–140 as shown. Moreover, the PIC 120 includes a register 145 to determine the current operation priority of the host processor 105 and is programmable through information lines 150 in order to determine which IRQ lines 126 and 128–140 are currently valid and their relative priority.

For example, if one of the peripheral devices (e.g., peripheral device 110a) needs the host processor 105 to perform a service, the peripheral device 110a transmits an interrupt request to the PIC 120 by asserting at least one of its IRQ lines (e.g., $IRQ_1$ line 126). If the service associated with the interrupt request has a greater priority than the current operation of the host processor 105, the PIC 120 asserts an interrupt "INTR" line 155. This interrupts the host processor 105, forcing the host processor 105 to temporarily transition from its current program to a special interrupt service routine. Supporting a limited number of interrupt requests may have been sufficient for a conventional PIC within the uni-processor system, however, with the advent of multi-processor systems, there exists a need for supporting a greater number of interrupt requests. As a result, approximately four years ago, Intel® Corporation of Santa Clara, Calif. developed APICs.

Well known to those skilled in the art, the APIC is based on a distributed architecture in which interrupt requests are distributed from an "I/O" APIC, coupled to an interrupt source (e.g., peripheral), to a "local" APIC of an interrupt destination (e.g., microprocessor). It is contemplated that the local and I/O APICs may be implemented onto either a single chip or may be integrated with other system components. These APICs operate as another interrupt delivery mechanism, communicating with each other over a dedicated interrupt controller communications ("ICC") bus, allowing multiple processors to share interrupt service activities with one another. Although many current operating systems have been coded to operate with APICs, there exists a number of prior operating systems which exclusively operate with a PIC. As a result, it is quite common to hard-wire both types of controllers together in order to support both interrupt delivery mechanisms as shown in FIG. 2.

Figure 2:
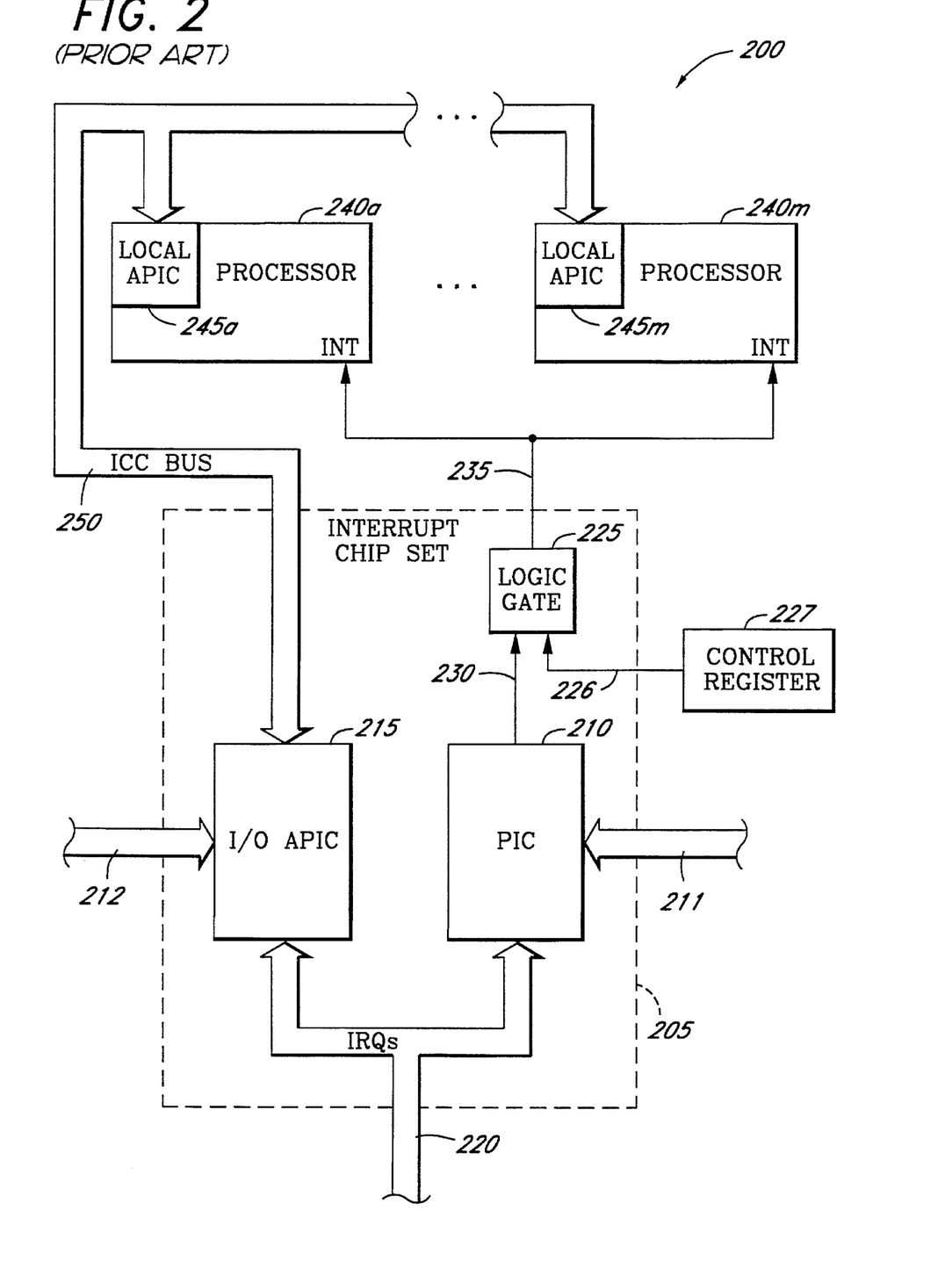
FIG. 2 is a block diagram of a conventional multi-processor system comprising a first I/O chip set incorporating a conventional PIC delivering interrupts to the processors through an interrupt control line and an I/O advanced programmable interrupt controller ("APIC") coupled to local APICs via an interrupt control communication bus.

Referring now to FIG. 2, a conventional multi-processor system 200 relies on an interrupt chip set 205 (e.g., an Intel® 82374EB) to provide multiple interrupt delivery mechanisms. The interrupt chip set 205 comprises a PIC 210 (e.g., Intel® 82C59) and an I/O APIC 215, both of which are programmable through communication lines 211 and 212, respectively. Selecting whether the PIC 210 or the I/O APIC 215 is responsible for controlling interrupt delivery is performed by writing to particular control registers (not shown) within the interrupt chip set 205.

The PIC 210 is coupled to a limited number of IRQ input lines 220 and a first input of a logic gate 225 (e.g., an AND gate) via a PIC interrupt line 230. Upon monitoring these IRQ interrupt lines 220, if the PIC 210 detects an interrupt request (i.e., asserted. IRQ line), the PIC 210 asserts the PIC interrupt line 230. As a result, the logic gate 225 asserts an interrupt "INTR" line 235, which interrupts a designated one of a plurality of processors 240a–240m ("m" being arbitrary), depending on whether the control line 226, coupled to a second input of the logic gate 225 is asserted.

For the logic gate 225 having an "AND" functionality, it asserts the INTR line 235 if the control line 226 is asserted. This occurs when a predetermined control bit of a control register 227 (i.e., an "interrupt mode configuration" register) is set by an operating system (not shown) of the multi-processor system 200. The control register 227 and its operations are discussed on Page 3–6 of a document entitled "Multiprocessor Specification Version 1.1" recently published by Intel® Corporation of Santa Clara, Calif. This document is incorporated herein by reference.

Referring still to FIG. 2, the I/O APIC 215 is also coupled to the IRQ input lines 220. If the I/O APIC 215 detects an interrupt request which is not exclusively handled by the PIC 210, the I/O APIC 215 places an interrupt signal onto an ICC bus 250. The ICC bus 250 propagates the interrupt signal into local APICs 245a–245m implemented within each of the plurality of processors 240a–240m, respectively.

Thus, for those interrupt requests handled exclusively by the PIC 210, the operating system sets the control bit causing the assertion of the control signal input into the second input of the logic gate 225. This enables the PIC 210 to assert the INTR line 235. Such interrupt requests may include, but are not limited to, initialization of the multi-processor system by its Basic Input/Output Subsystem ("BIOS"), various instructions from older operating systems such as DOS™, Windows™ 3.1, Windows™ 95 and the like. Otherwise, the operating system clears the control bit which de-asserts the control signal input into the second input of the logic gate 225. This directs the I/O APIC 215 to deliver interrupts to the processors 240a–240m. This embodiment, however, offers many disadvantages.

One disadvantage is that this embodiment provides a non-scalable architecture in that it is incapable of providing interrupt services for more than approximately fourteen interrupt requests. More specifically, this embodiment offers no support for the inclusion of additional I/O APICs within the computer system to service more types of interrupts.

Hence, it would be desirable to provide a circuit and method for enabling a computer system to appropriately switch between an interrupt delivery mechanism controlled by the conventional PIC and an interrupt delivery mechanism controlled by at least one additional I/O APIC. Additionally, it would be advantageous to perform such switching in a transparent fashion so that no special instructions are required in the operating system other than those instructions required to support typical PIC and/or APIC operations.

SUMMARY OF THE INVENTION

In view of the foregoing disadvantages, there exists an apparent need for a switching circuit which transparently switches between two independent interrupt delivery mechanisms implemented within a multi-processor system having a first interrupt chip set and a second interrupt chip set. The first interrupt chip set, including a programmable interrupt controller, is adapted to service an interrupt request by transmitting an interrupt signal to at least one processor upon detecting that one of a plurality of interrupt request lines (i.e., a "IRQ1 line"), coupled to the first interrupt chip set, is asserted. The second interrupt chip set, including an application program interrupt controller, is adapted to detect a second interrupt request through assertion of a second interrupt request line ("IRQ2 line").

The switching circuit comprises a combinatorial logic unit, coupled to the IRQ1 line and the IRQ2 line, for selectively (i) asserting the IRQ1 line upon detecting the second interrupt request, provided the second interrupt request requires interrupt service by the first interrupt chip set and (ii) deasserting the IRQ1 line upon detecting the second interrupt request if the second interrupt request propagating through the IRQ2 line does not require interrupt service by the first interrupt chip set.

BRIEF DESCRIPTION OF THE DRAWINGS

The features and advantages of the present invention will become apparent from the following detailed description of the present invention in which.

DETAILED DESCRIPTION OF THE PRESENT INVENTION

A circuit and method for transparently enabling and disabling interrupt delivery mechanisms employed in a multi-processor system is described below in detail. In the following description, for purposes of explanation, specific details are set forth in order to provide a thorough understanding of the present invention. However, it will be apparent to one skilled in the art of circuit design that the present invention may be practiced without these specific details. In other instances, well known operations, functions and devices are not shown in order to avoid obscuring the present invention.

Figure 3:
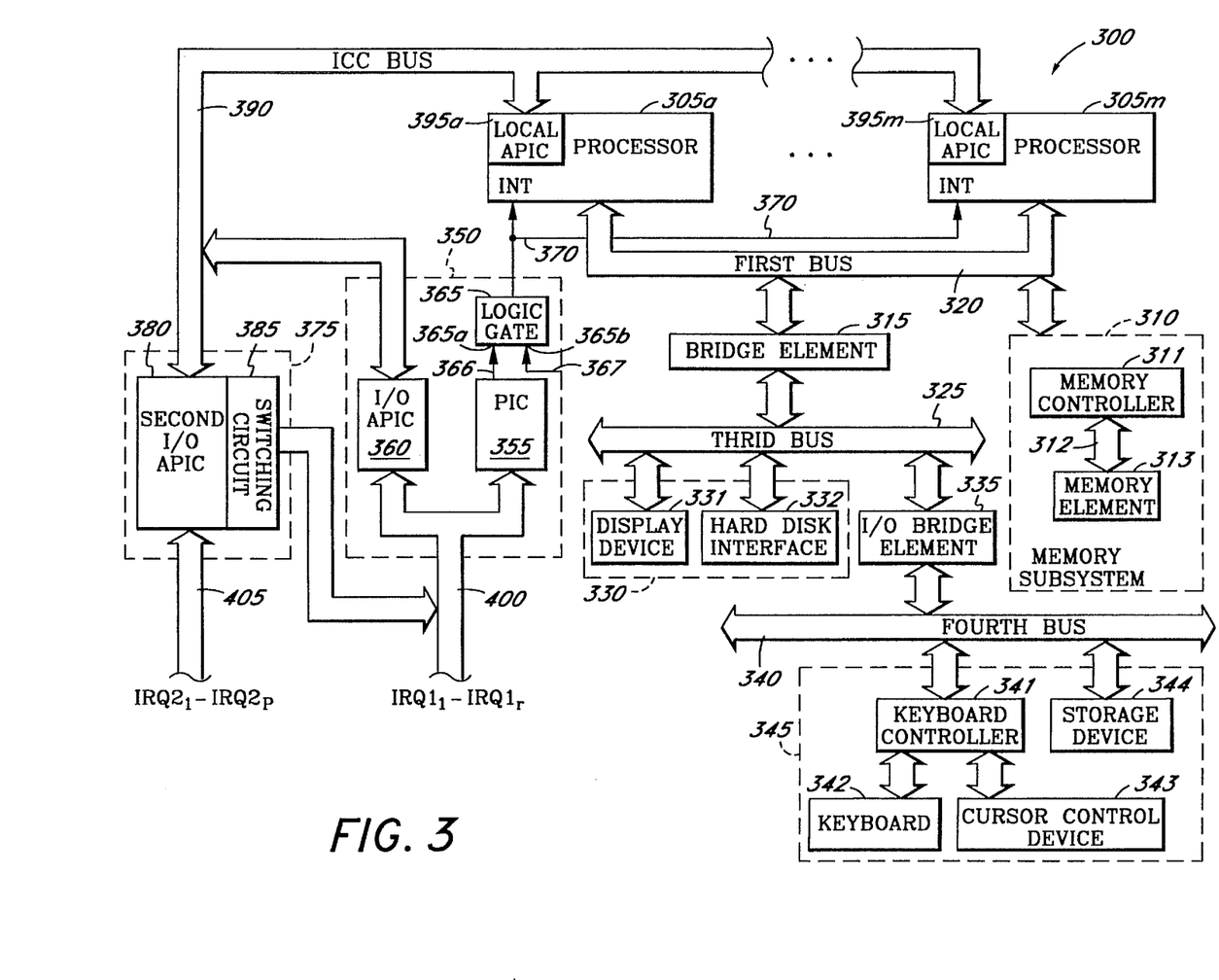
FIG. 3 is a block diagram of an illustrative embodiment multi-processor system comprising the first interrupt chip set of FIG. 2 supporting a limited number of interrupt requests and a second interrupt chip set including at least a second I/O APIC supporting "p" additional interrupt requests, wherein a switching circuit couples the second I/O APIC to the first interrupt chip set to allow the multi-processor system to support additional interrupt requests.

Referring to FIG. 3, an illustrative embodiment of a multi-processor system 300 utilizing the present invention is illustrated. The system 300 comprises a plurality of processors 305a–305m, a memory subsystem 310 and a bridge element 315, all of which being coupled to a first bus 320 including data, address and control lines. The memory subsystem 310 includes a memory controller 311, coupled between the first bus 320 and a second bus 312, providing an interface for controlling access to at least one memory element 313 such as dynamic random access memory ("DRAM"), read only memory ("ROM"), video random access memory ("VRAM") and the like. The memory element 313 stores information and instructions for the processors 305a–305m.

The bridge element 315 operates as an interface between the first bus 320 and a third bus 325, such as a peripheral component interconnect ("PCI") bus, by providing a communication path (i.e., gateway) for a first group of peripheral devices 330 coupled to the third bus 325 to access information from or transfer information to the memory subsystem 310 or the processors 305a–305m. The first group of peripheral devices 330 include, but are not limited to a display device 331 (e.g., cathode ray tube, liquid crystal display, flat panel display, etc.) for displaying images and a hard disk interface 332.

The third bus 325 may be further coupled to an I/O bridge element 335 which provides an interface between the first group of peripheral devices 330 and a second group of peripheral devices 345 of a fourth bus 340 (e.g., an EISA bus). This second group of peripheral devices 345 include, but are not limited to a keyboard controller 341 for controlling operations of an alphanumeric keyboard 342 and a cursor control device 343 (e.g., a mouse, track ball, touch pad, joystick, etc.) as well as a mass storage device 344 (e.g., magnetic tapes, hard disk drive, floppy disk drive, etc.). It is contemplated that the computer system shown in FIG. 3 may employ some or all of these components or different components than those illustrated.

The first and second groups of peripheral devices 330 and 345 are arbitrarily configured to transmit interrupt requests to either a first interrupt chip set 350 or a second interrupt chip set 375. The first interrupt chip set 350, identical to the interrupt chip set 205 of FIG. 2, includes a PIC 355 and an I/O APIC 360, both of which being coupled to a first set of "r" IRQ lines (hereinafter collectively referred to as, "IRQ1 lines") 400 to support at most "r" ($IRQ1_1$–$IRQ1_r$) interrupts. The variable "r" is an arbitrary number.

The PIC 355 is coupled to the IRQ1 lines 400 and a first input 365a of a logic gate 365 via a PIC interrupt line 366. If the PIC 355 detects that any of the IRQ1 lines 400 is asserted, the PIC 355 asserts the PIC interrupt line 366. As a result, the logic gate 365 outputs an interrupt signal via an interrupt "INTR" line 370, provided a control line 367 coupled to a second input 365b of the logic gate 365 is propagating an asserted control signal. The logical value of this control signal is determined by an operating system (as discussed in reference to FIG. 2) setting or clearing a control register (not shown). This is accomplished during system initialization when the operating system is instructed as to which interrupts are supported by the PIC 355 and which are not.

The I/O APIC 360 is further coupled to the IRQ1 lines 400. If the I/O APIC 360 detects an interrupt request which is not exclusive to the PIC 355, the I/O APIC 360 places an interrupt signal onto an ICC bus 390. The ICC bus 390 is a three wire synchronous bus in which two wires are used for data transmission and one wire is used for clocking. The ICC bus 390 is coupled to all APICs including the I/O APIC 360, a second I/O APIC 380 and local APICs 395a–395m implemented within processors 305a–305m as shown in FIG. 3. Arbitration for the ICC bus 390 is performed under a rotating priority scheme using a single wire of the ICC bus 390.

The second interrupt chip set 375 includes at least a second I/O APIC 380 and a switching circuit 385. The second I/O APIC 380 is coupled a second set of "p" IRQ lines 405 and the ICC bus 390 which propagates an interrupt signal to one of the plurality of local APICs 395a–395m if one of the second set of "p" IRQ lines 405 is asserted. Thus, the multi-processor system 300 is able to support "p" additional interrupt requests, namely "$IRQ2_1$"–"$IRQ2_p$". For the scope of this description, the second set of IRQ lines 405 shall be collectively referred to as "IRQ2 lines", an arbitrary interrupt request as "$IRQ2_i$" ("i"-1,2,3 . . . or "p") and "p" is an arbitrary number, preferably, but not necessarily greater than "r". These additional "p" interrupt requests are typically distinct from those interrupt requests ($IRQ1_1$–$IRQ1_r$) associated with the IRQ1 lines 400.

The switching circuit 385 is coupled to both the IRQ1 and IRQ2 lines 400 and 405. The primary purpose of the switching circuit 385 is to establish a connection between the IRQ1 and IRQ2 lines 400 and 405. Thus, interrupt requests ($IRQ2_1$–$IRQ2_p$), initially propagating through the IRQ2 lines 405, may be selectively input into the IRQ1 lines 400. This allows the PIC 355 of the first chip set 350 to transparently service any interrupts requiring a PIC interrupt delivery mechanism. However, for those additional interrupt requests serviceable by an I/O APIC (e.g., the second I/O APIC 380), the switching circuit 385 appropriately disconnects the $IRQ_1$–$IRQ_p$ interrupt requests from propagating to the IRQ1 lines 400. As a result, the I/O APIC 360 is precluded from inadvertently issuing an extra interrupt request jeopardizing proper operation of the multi-processor system 300.

Figure 4A:
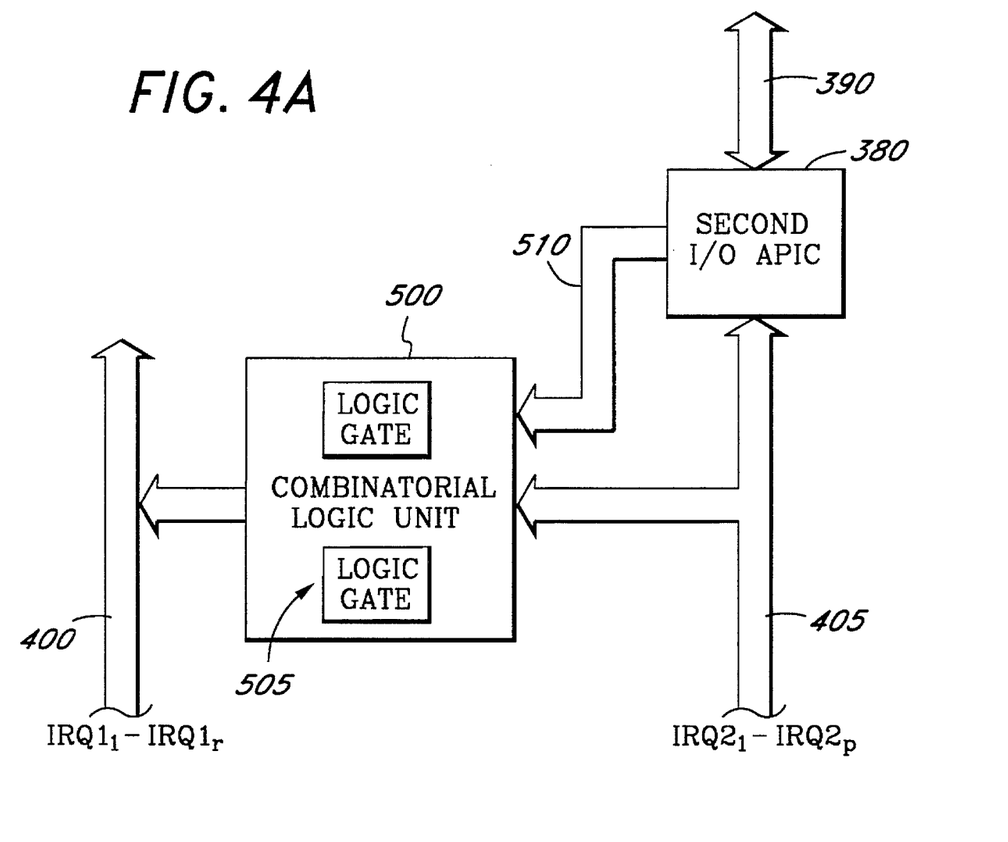
FIG. 4A is a block diagram of an illustrative embodiment of the present invention being the switching circuit of FIG. 3 coupling the second I/O APIC to the first interrupt chip set in order to disable the I/O APIC of the first interrupt chip set from initiating interrupts resulting from interrupt requests propagating through the second set of IRQ lines.

Referring to FIG. 4A, a first embodiment of the switching circuit 385 is shown. The switching circuit 385 comprises a combinatorial logic unit 500 including a plurality of logic circuits 505, preferably corresponding to the number of IRQ2 lines 400, which are configured in parallel with one another. Each of these logic circuit receives as input a unique interrupt request $IRQ2_1$, $IRQ2_2$ . . . or $IRQ2_p$ via the IRQ2 lines 405 and digital (i.e., binary) contents of a mask bit associated with that interrupt request $IRQ2_1$, $IRQ2_2$ . . . or $IRQ2_p$ via control lines 510. The mask bits are employed within the second I/O APIC 380 and are used as enable/disable bits associated with each interrupt input defined by the I/O APIC architecture.

Figure 4B:
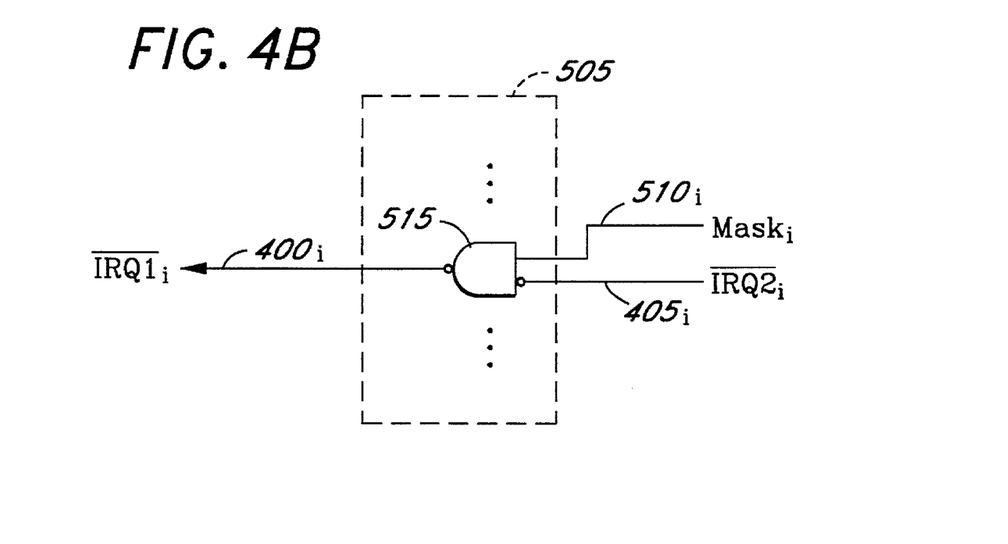
FIG. 4B is an illustrative circuit diagram of one of the plurality of logic circuits employed within a combinatorial logic unit of the switching circuit.

In FIG. 4B, for illustrative purposes, one of the plurality logic circuits 505 (e.g., an $i^{th}$ logic circuit 505i) is shown. The logic circuits 505i receives as input an interrupt request through assertion of an $IRQ2_i$ line 405i and an $i^{th}$ mask bit ("$Mask_i$") associated with $IRQ2_i$ via control line 510i. These inputs are transmitted into at least one logic gate 515 (e.g., NAND gate or any gates configured approximately) which uses $Mask_i$ to selectively disable passing interrupts from the $IRQ2_i$ line 405i to the selected $IRQ1_i$ line 400i by deasserting $Mask_i$. For example, if $Mask_i$ is asserted, $IRQ2_i$ is ignored by the I/O APIC 380. Thus, the combinatorial logic unit 500 asserts a corresponding $IRQ1_i$ 400i whenever that $IRQ2_i$ 405i is asserted. This embodiment allows interrupts from any device to be operated upon by either the PIC 355 or I/O APICs 360 and 380 of FIG. 3 so that an operating system supporting either interrupt architecture will be able to use all devices.

However, care must be taken to ensure that if more than one device can cause one of the IRQ1 lines 400 to be asserted, it is preferable that active-low, level sensitive interrupts, such as those supported by a Peripheral Component Interconnect ("PCI") bus, are used. Edge sensitive or active-high interrupts used by some devices may not be compatible with this interrupt sharing.

Figure 5A:
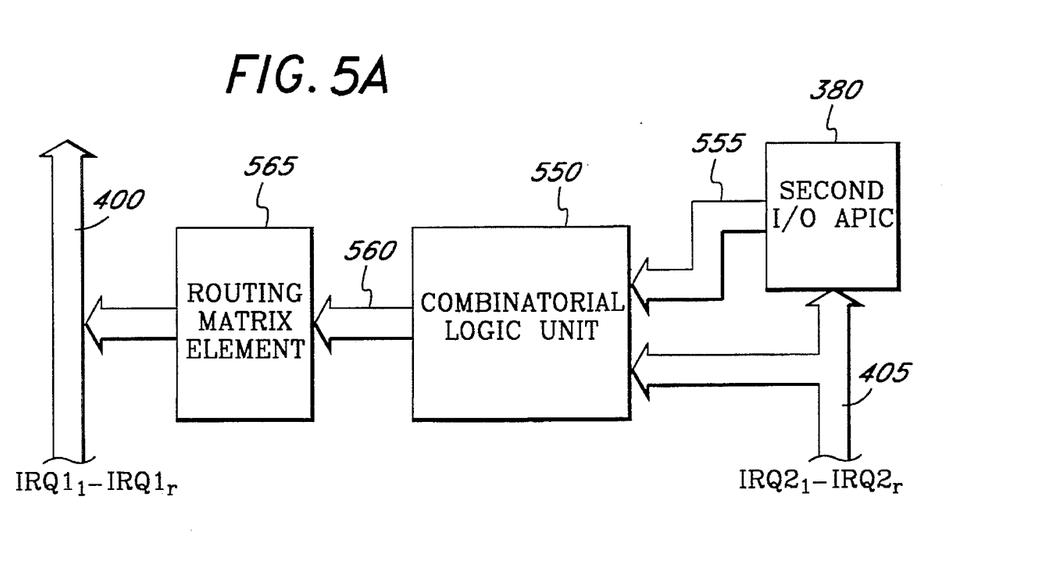
FIG. 5A is a block diagram of a second illustrative embodiment of the present invention being a switching circuit disabling a routing matrix element coupled to the first set of IRQ lines in order to provide transparent switching of the interrupt delivery mechanisms provided by both interrupt chip sets.

Referring to FIG. 5A, a second embodiment of the switching circuit 385 is shown. The switching circuit 385 comprises a combinatorial logic unit 550 which receives as input $IRQ2_1$–$IRQ2_p$ and corresponding control lines 555 as discussed above. The combinatorial logic unit 550 behaves identically to the combinatorial logic unit of FIG. 4A except that it outputs a series of output signals ($IRQ2_i$ logically ANDed with $Mask_i$) via uni-directional lines 560 into a routing matrix element 565 rather than open collector outputs. The routing matrix element 565 maps various interrupt requests propagating through the IRQ2 request lines 405 into appropriate $IRQ1_1$–$IRQ1_r$ lines or $IRQ_1$, $IRQ_3$–$IRQ_{15}$ lines when coupled to an Intel® 82374EB.

Figure 5B:
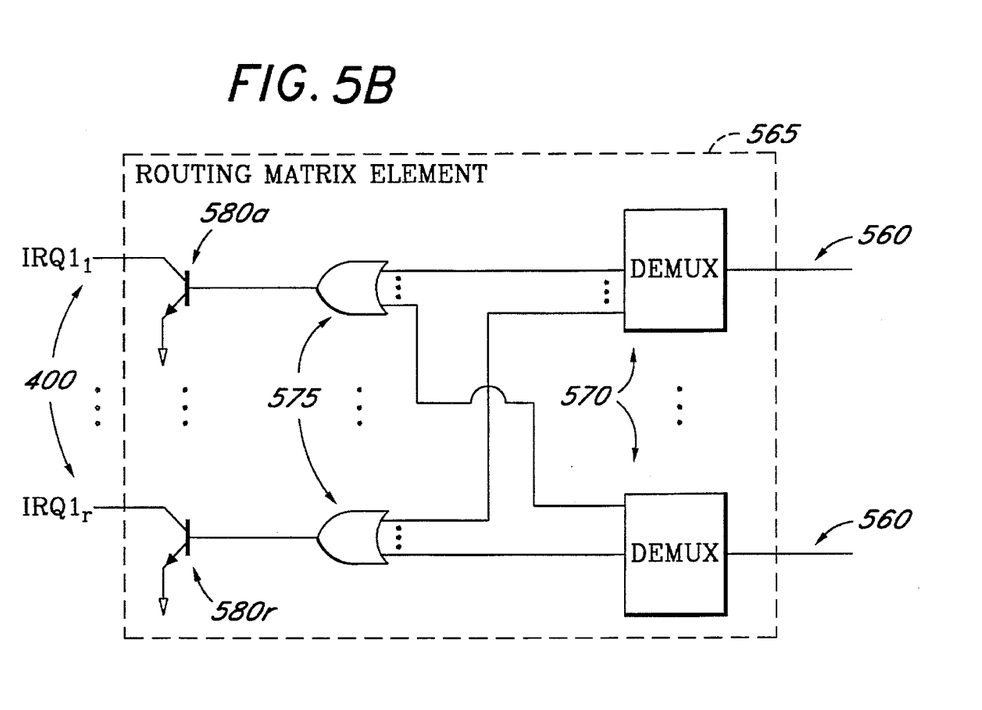
FIG. 5B is a circuit diagram of the routing matrix element of FIG. 5A.

As shown in FIG. 5B, well known in the art, the routing matrix element 565 includes a number of conventional logic gates (e.g., demultiplexers) 570 corresponding to each output signal from the combinational logic circuit 550. The outputs of these demultipiexers 570 are selectively input into logic gates 575 (with "OR" functionality) correspondingly coupled to each of the IRQ1 lines 400. These demultiplexers 570 are selected by registers set by the BIOS or the operating system to operate in combination with the logic gates 575 in order to provide a programmable mapping of the $IRQ2_1$–$IRQ2_p$ interrupts. The routing matrix 565 then can drive the appropriate IRQ1 lines using an open collector output of NPN transistors 580a–580r whenever one of the additional interrupt requests $IRQ2_1$–$IRQ2_p$ is asserted and its corresponding mask bit is set. This flexible, transparent mapping allows the BIOS to configure the routing matrix 565 to ensure that all interrupting devices that map to a particular $IRQ1_1$–$IRQ1_r$ are compatible i.e., they are all level sensitive, active-low interrupts.

The present invention described herein may be designed in many different embodiments evident to one skilled in the art than those described without departing from the spirit and scope of the present invention. For example, although particular exemplary clock frequencies have been set forth, principles of the invention may be applied to systems employing different frequencies. The invention should, therefore be measured in terms of the claims which follow.

What is claimed is:

1. Adapted to a first interrupt circuit including a programmable interrupt controller and a first advanced programmable interrupt controller configured to transfer a first interrupt request through at least one interrupt request ("IRQ1") line, and a second interrupt circuit including a second advanced programmable interrupt controller configured to transfer a second interrupt request through at least one interrupt request ("IRQ2") line, a switching circuit comprising:

a combinatorial logic unit coupled to said IRQ1 line and said IRQ2 line, said combinatorial logic unit (i) asserts said IRQ1 line if said programmable interrupt controller is needed to service said second interrupt request, and (ii) deasserts said IRQ1 line if said second interrupt request is serviceable by said second advanced programmable interrupt controller to preclude said first advanced programmable interrupt controller from servicing said second interrupt request.

2. The switching circuit according to claim 1, wherein said combinatorial logic unit is further coupled to at least one control signal line enabling said second interrupt circuit to transmit at least one control signal through said at least one control signal line to assist in controlling assertion and deassertion of said IRQ1 line.

3. The switching circuit according to claim 1, wherein said second advanced programmable interrupt controller including a mask register in which at least one mask bit is used to assert and alternatively deassert said IRQ1 line.

4. The switching circuit according to claim 1 further comprising a routing matrix element coupled between said combinatorial logic unit and said IRQ1 line, said routing matrix element receives an output signal from said combinatorial logic unit and appropriately routes said output signal to said IRQ1 line in order to assert and alternatively deassert said IRQ1 line.

5. The switching circuit according to claim 1 further comprising a routing matrix element coupled between said combinatorial logic unit and said IRQ1 line, said routing matrix element receives an output signal from said combinatorial logic unit and appropriately routes said output signal to said IRQ1 line in order to assert and alternatively deassert said IRQ1 line.

6. The switching circuit according to claim 2, wherein said combinatorial logic unit includes at least one logic gate receiving said second interrupt request and said at least one control signal.

7. Operating in cooperation with a first interrupt circuit functioning as a first interrupt delivery mechanism by transferring a first interrupt request through at least one interrupt request ("IRQ1") line and a second interrupt circuit functioning as a second interrupt delivery mechanism by transferring a second interrupt request through at least one interrupt request ("IRQ2") line, a switching circuit comprising:

logic means for selectively (i) asserting said IRQ1 line upon detecting said second interrupt request if said second interrupt request requires interrupt service by the first interrupt circuit, and (ii) deasserting said IRQ1 line upon detecting said second interrupt request if said second interrupt request propagating through said IRQ2 line does not require interrupt service by said first interrupt circuit; and signaling means for controlling assertion and deassertion of said IRQ1 line, said signaling means being coupled to said logic means.

8. The switching circuit according to claim 7, wherein said first interrupt circuit includes a programmable interrupt controller and an advanced programmable interrupt controller.

9. The switching circuit according to claim 8, wherein said second interrupt circuit includes at least one advanced programmable interrupt controller.

10. The switching circuit according to claim 9, wherein said logic means includes at least one logic gate receiving said second interrupt request and at least one control signal propagating through said signaling means.

11. The switching circuit according to claim 10 further comprising:

routing means for receiving an output signal from said logic means and for appropriately routing said output signal to said IRQ1 line in order to assert and alternatively deassert said IRQ1 line, said routing means is coupled between said logic means and said IRQ1 line.

12. A computer system comprising:

at least one processor;

an interrupt bus coupled to said at least one processor;

an interrupt line coupled to said at least one processor;

at least a first interrupt request line;

at least a second interrupt request line;

a first interrupt circuit coupled to said interrupt bus and said interrupt line, said first interrupt circuit receives a first interrupt request through said first interrupt request line and either places a signal representative of said first interrupt request onto said interrupt bus or asserts said interrupt line;

a second interrupt circuit coupled to said interrupt bus, said second interrupt circuit receives a second interrupt request through said second interrupt request line; and a switching circuit coupled to said first and second interrupt request lines, said switching circuit selectively (i) asserts said first interrupt request line upon detecting said second interrupt request requires interrupt service to be requested by said first interrupt circuit, and (ii) deasserts said first interrupt request line upon detecting that said second interrupt request does not require interrupt service to be requested by said first interrupt circuit.

13. The computer system according to claim 12, wherein said first interrupt circuit includes a programmable interrupt controller coupled to said interrupt line.

14. The computer system according to claim 13, wherein said first interrupt circuit further includes an advanced programmable interrupt controller coupled to said interrupt bus.

15. The computer system according to claim 13, wherein said second interrupt circuit includes at least one advanced programmable interrupt controller coupled to said interrupt bus.

16. The computer system according to claim 15, wherein said switching circuit includes a combinatorial logic unit coupled to said first interrupt request line and said second interrupt request line, said combinatorial logic unit selectively asserts said first interrupt request line upon detecting said second interrupt request requires interrupt servicing exclusively by said first interrupt circuit and deasserts said first interrupt request line upon detecting said second interrupt request does not require interrupt servicing by said first interrupt circuit.

17. The computer system according to claim 16, wherein said combinatorial logic unit is further coupled to at least one control signal line propagating at least one control signal from said second interrupt circuit, said at least one control signal controls assertion and deassertion of said first interrupt request line.

18. The computer system according to claim 17, wherein said combinatorial logic unit includes at least one logic gate receiving said second interrupt request and said at least one control signal.

19. The computer system according to claim 18, further comprising a routing matrix element coupled between said combinatorial logic unit and said first interrupt request line, said routing matrix element receives an output signal from said combinatorial logic unit and appropriately routes said output signal to said first interrupt request line in order to assert and alternatively deassert said first interrupt request line.

20. A computer system comprising:

processor means for servicing a plurality of interrupt requests;

bus means for interrupting said process or means;

line means for interrupting said processor means;

first interrupt means for receiving a first interrupt request through a first interrupt request line for signaling said processor means to service said first interrupt request;

second interrupt means for receiving a second interrupt request through a second interrupt request line; and switching means for selectively (i) asserting said first interrupt request line upon detecting that said second interrupt request requires interrupt service to be requested by said first interrupt means and (ii) deasserting said first interrupt request line upon detecting that said second interrupt request does not require interrupt service to be requested by said first interrupt means.

21. The computer system according to claim 20, wherein said first interrupt means includes a programmable interrupt controller.

22. The computer system according to claim 21, wherein said first interrupt means further includes a programmable interrupt controller coupled to said line means.

23. The computer system according to claim 21, wherein said second interrupt means includes at least one advanced programmable interrupt controller coupled to said bus means.

24. The computer system according to claim 23, wherein said switching means includes logic means for selectively asserting and alternatively deasserting said first interrupt request line.

25. The computer system according to claim 24, wherein said logic means is further coupled to at least one control signal line propagating at least one control signal from said second interrupt means, said at least one control signal controls assertion and deassertion of said first interrupt request line.

26. The computer system according to claim 25, wherein said logic means includes at least one logic gate receiving said second interrupt request and said at least one control signal.

27. The computer system according to claim 26, further comprising a routing means, coupled between said logic means and said first interrupt request line, to receive an output signal from said logic means and appropriately route said output signal to said first interrupt request line in order to assert and alternatively deassert said first interrupt request line.

28. A method for preventing a first interrupt circuit, including at least a programmable interrupt controller and a first advanced programmable interrupt controller coupled to a plurality of interrupt request lines, from generating an interrupt signal based on at least one interrupt request signal input into a second interrupt circuit including at least a second advanced programmable interrupt controller, said method comprising the steps of:

determining said at least one interrupt request signal has been asserted, wherein said at least one interrupt request signal is serviceable by at least said second advanced programmable interface controller; and disabling an interrupt request line of said plurality of interrupt request lines configured to receive said at least one interrupt request in order to prevent said first interrupt circuit from generating said interrupt signal, wherein said disabling step includes the steps of providing a logic gate having an output coupled to said interrupt request line and receiving as input said at least one interrupt request signal and a mask signal, and deasserting said mask signal to preclude said interrupt request line from being asserted.

29. A computer system comprising:

at least one processor;

an interrupt bus coupled to said at least one processor;

an interrupt line coupled to said at least one processor at least a first interrupt request line;

at least a first interrupt request line;

a first interrupt circuit including a programmable interrupt controller and a first advanced programmable interrupt controller configured to transfer a first interrupt request through said first interrupt request line;

a second interrupt circuit including a second advanced programmable interrupt controller configured to transfer a second interrupt request through said second interrupt request line; and a switching circuit, coupled to said first interrupt request line and said second interrupt request line, including:

a combinatorial logic unit, and routing matrix element coupled between said combinatorial logic unit and said first interrupt request line, said routing matrix element receives an output signal from said combinatorial logic unit and appropriately routes said output signal to assert and alternatively deassert said first interrupt request line.

* * * * *

UNITED STATES PATENT AND TRADEMARK OFFICE
CERTIFICATE OF CORRECTION

| | | |
|---|---|---|
| PATENT NO. | : | 5,619,706 |
| DATED | : | April 8, 1997 |
| INVENTOR(S) | : | Bruce Young |

It is certified that error appears in the above-identified patent and that said Letters Patent is hereby corrected as shown below:

In column 9 at line 34 delete "process or means;" and insert --processor means--

Signed and Sealed this

Twenty-third Day of September, 1997

Attest:

BRUCE LEHMAN

Attesting Officer

Commissioner of Patents and Trademarks